(12) United States Patent
Mescher

(10) Patent No.: US 7,826,144 B2
(45) Date of Patent: Nov. 2, 2010

(54) HIGH SPEED PIEZOELECTRIC OPTICAL SYSTEM WITH TUNABLE FOCAL LENGTH

(75) Inventor: Mark J. Mescher, West Newton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 12/115,142

(22) Filed: May 5, 2008

(65) Prior Publication Data

US 2008/0225379 A1 Sep. 18, 2008

Related U.S. Application Data

(62) Division of application No. 10/293,823, filed on Nov. 12, 2002, now Pat. No. 7,369,723.

(60) Provisional application No. 60/348,136, filed on Nov. 9, 2001.

(51) Int. Cl.
*G02B 1/06* (2006.01)
(52) U.S. Cl. .................... 359/665; 359/666
(58) Field of Classification Search .......... 359/665, 359/666, 667, 820
See application file for complete search history.

(56) References Cited

U.S. PATENT DOCUMENTS

| 4,781,445 | A | 11/1988 | Baba et al. |
| 4,989,958 | A | 2/1991 | Hamada et al. |
| 5,672,001 | A | 9/1997 | Bertling et al. |
| 6,188,526 | B1 * | 2/2001 | Sasaya et al. ............... 359/666 |
| 6,344,930 | B1 * | 2/2002 | Kaneko et al. ............... 359/666 |
| 6,515,791 | B1 | 2/2003 | Hawwa et al. |
| 7,369,723 | B1 * | 5/2008 | Mescher ...................... 385/33 |

OTHER PUBLICATIONS

R. Schellin et al., "Measurements of the mechanical behaviour of micromachined silicon and silicon-nitride membranes for microphones, pressure sensors and gas flow meters", *Sensors and Actuators a*, 41-42, pp. 287-292, 1994.

(Continued)

*Primary Examiner*—Timothy J Thompson
(74) *Attorney, Agent, or Firm*—Foley & Lardner LLP; Matthew L. Fenselau; Steven A. Moore

(57) ABSTRACT

A varifocal optical system includes a substantially circular membrane deposited on a substrate, and a ring-shaped PZT thin film deposited on the outer portion of the circular membrane. The membrane may be a MEMS-micromachined membrane, made of thermal oxide, polysilicon, $Z_rO_2$ and $S_iO_2$. The membrane is initially in a buckled state, and may function as a mirror or a lens. Application of an electric voltage between an inner and outer electrode on the piezoelectric thin film induces a lateral strain on the PZT thin film, thereby altering the curvature of the membrane, and thus its focal length. Focal length tuning speeds as high as 1 MHz have been demonstrated. Tuning ranges of several hundred microns have been attained. The varifocal optical system can be used in many applications that require rapid focal length tuning, such as optical switching, scanning confocal microscopy, and vibration compensation in optical storage disks.

12 Claims, 13 Drawing Sheets

OTHER PUBLICATIONS

J. J. Berstein et al., "Advanced MEMS Ferroelectric Ultrasound 2D Arrays", 1999 *IEEE Ultrasonics Symposium*, 0-7803-5722, pp. 1145-1153, Jan. 1999.

Minoru Sakata et al., "Basic Characteristics of a Piezoelectric Buckling Type of Actuator", *Transducers '95—Eurosensors IX*, pp. 422-425, Jun. 25-29, 1995.

Gleb Vdovin et al, "Flexible mirror micromachined in silicon", *Applied Optics*, vol. 34, No. 16, pp. 2968-2972, Jun. 1, 1995.

K. R. Udayakumar et al., "Ferroelectric Thin Film Ultrasonic Micromotors", 1991 *IEEE*, CH 2957-Sep. 1991, pp. 109-113, 1991.

N. T. Adelman, "Sperical mirror with piezoelectrically controlled curvature", *Applied Optics*, vol. 16, No. 12, pp. 3075-3077, Dec. 1977.

S. A. Kokorowski, "Analysis of adaptive optical elements made from piezoelectric bimorphs", *J. Opt. Soc. Am.*, vol. 69, No. 1, pp. 181-187, Jan. 1979.

\* cited by examiner

Table 1. Device parameters

| Material | Thickness [μm] | Approximate Average Young's modulus [GPa] | Residual stress [MPa] |
|---|---|---|---|
| $SiO_2$/Si/ $SiO_2$/$ZrO_2$ | 1.5/2.8/ 1.5/0.5 | 100 | 300 C (compressive) |
| PZT | 2.7 | 80 | 75 T (tensile) |

FIG. 6

HIGH SPEED PIEZOELECTRIC OPTICAL SYSTEM WITH TUNABLE FOCAL LENGTH

CROSS REFERENCES TO RELATED APPLICATIONS

This application is a divisional of U.S. patent application Ser. No. 10/293,823, filed Nov. 12, 2002, which claims the benefit of U.S. provisional patent application Ser. No. 60/348,136, entitled "Piezoelectric Deformable Varifocal Mirror, and filed on Nov. 9, 2001.

STATEMENT OF GOVERNMENT INTEREST

The U.S. Government has no interest in or to this patent.

FIELD OF THE INVENTION

The present invention relates to optical systems, and in particular relates to a high speed, piezoelectrically actuated optical system with tunable focal length.

BACKGROUND

There is a growing demand for optical elements having tunable focal lengths, including adaptive optics systems. For example, adaptive optics technology is used in astronomy in order to overcome significant limitations in the image quality of telescopes, caused by atmospheric turbulence. Also, most optical systems have defects in construction or factors in their environment that prevent them from operating optimally. These defects can be continually measured and automatically corrected by adaptive optics systems, which typically include deformable mirrors whose focal lengths can be changed.

At present, methods and systems that are known in the art for actively changing the focal length of an optical system include at least the following three categories. The first category includes large-scale deformable-optics devices. In these devices, the mirror surface is composed of many pixels, each of which has a curvature or angle of inclination that can be altered through an applied voltage to a bulk piezoelectric actuator. The thickness of the deformable portion of each pixel is relatively large, and thus large forces are required and slow speeds are typical. The second category includes electrostatically actuated devices. These devices consist of large membranes suspended over an array of independently controlled electrodes. Voltages applied to these electrodes generate forces on the portion of the membrane in close proximity to the electrodes, causing deflection of the membranes. The shape of the membrane, and thus its curvature and focal length, are determined by the cumulative affects of the electrostatic forces generated by the applied voltages. A third mechanism that provides adaptive focusing uses a lens that translates mechanically along the optical axis, relative to other lenses in the path, thus changing the focal length. These systems have been demonstrated in both macro- and MEMS (microelectromechanical systems) scales. Canon has demonstrated relatively high speeds (approximately 100 Hz bandwidth) with large-aperture lenses, using patented ultrasonic motors that translate one of the optics components within a compound lens along the optical axis. There are also MEMS-based versions which use thin-film piezoelectric cantilevers or similar structures, to move the optical component along the optical axis relative to a static focusing element.

The prior art methods described above suffer from a number of disadvantages. Regarding the first category of devices described above, the capability of current large-scale deformable-optics devices is limited by the large stiffness in typical macro- or mini-mirrors. This stiffness is caused by the appreciable thickness of the actuator and mirror layers. Much larger changes in focal length could potentially be achieved if this stiffness is reduced.

As for electrostatically actuated devices, such devices must avoid electrostatic pull-in onto a planar electrode, in order to maintain a constant curvature for the focusing element. As a result, gaps may be large and forces small. Small electrostatic forces necessitate the use of relatively compliant membranes for the mirrors, which thus limits their mechanical bandwidth. In addition, the non-linear forces generated by the non-uniform gap typically present in such devices will result in non-uniform bending of the plate. The multi-electrode schemes used to compensate for this distortion add additional complexity, particularly when curvature uniformity is required over a large tuning range.

Among mechanically actuated devices, the macroscale systems are typically slow because of the mass of the components. The MEMS versions have a maximum achievable change in focal length that is generally small (typically less than 10 μm), and thus the application is limited to fine tuning.

While piezo-actuated micro-mirrors have been used in conjunction with macro-scale lenses to achieve focusing devices, high-speed micro-lenses with tunable focal lengths have not yet been implemented. A high-speed deformable focusing element could provide new capabilities in numerous applications, such as optical switching, optical storage disks, and scanning confocal microscopy.

For these reasons, there is a need for a system and method that allows for high speed tuning of focal lengths of optical elements (such as mirrors and lenses) over a wide tuning range, and which do not suffer from the advantages described above. In particular, there is a need for high-speed micro-lenses with tunable focal lengths.

SUMMARY OF THE INVENTION

The present invention provides a variable focal length optical system, which is piezoelectrically actuated so as to rapidly change its focal length over a wide tuning range.

In one embodiment of the invention, a varifocal optical system includes a substrate, and a deformable optical element deposited on the substrate. The optical element may be a mirror, for example, or a lens. A piezoelectric thin film is deposited on at least a portion of the deformable optical element. A first electrode and a second electrode are disposed on the piezoelectric thin film. Application of an electric voltage between the first electrode and the second electrode alters the dimensions of the thin film, thereby deforming the optical element so as to alter its focal length.

In a preferred embodiment of the invention, the optical element is a membrane having a substantially circular configuration. The membrane has a thickness of about 0.5 microns to about 3.0 microns, and may be made of materials that include $S_iO_2$, $S_i$, $S_iN$, and $Z_rO_2$. The membrane is in a buckled state, and has an initial nominal curvature. In this patent application, "nominal curvature" is defined as the initial residual curvature of the membrane when it is in an unactuated state (no voltage applied).

The piezoelectric thin film is preferably made of PZT (lead zirconate titanate), although other piezoelectric materials are also within the scope of the present invention. The piezoelectric thin film is substantially ring shaped, and is positioned on the outer portion of the circular membrane. Upon application of an electric voltage between the first and second electrode, a lateral strain is induced in the thin film, thereby altering the out-of-plane deformation of the membrane. This results in a change in the curvature of the membrane, and consequently in a change in the focal length of the optical element. The focal length tuning frequency of the optical system can reach a speed of about 1 MHz.

The present invention features a method for tuning the focal length of an optical element. The method includes etching a substrate to fabricate a membrane in a buckled state, the membrane being characterized by a nominal curvature and a focal length. The method includes depositing a PZT thin film upon at least a portion of the membrane. The method includes providing a first electrode at an outer edge of the thin film, and a second electrode at an inner edge of the film. The method includes applying an electric voltage between the first and second electrodes, thereby inducing a lateral strain in the PZT thin film, wherein the lateral strain alters the nominal curvature and the focal length of the membrane.

In an alternative embodiment, the present invention features a varifocal lens that includes a volume of refractive liquid characterized by a focal length and a curvature. At least one membrane, described in paragraph 13 above, forms one or more boundaries of the volume of refractive liquid. A PZT thin film is deposited on the membrane, and includes a first and second electrode. Application of an electric voltage between the first electrode and the second electrode induces a compressive stress on the film, thereby modifying the curvature of the membrane and altering the focal length of the lens.

The varifocal optical lens features in the present invention may be used in other applications, for example sample height variation compensation in scanning confocal microscopy, vibration compensation for disk-based optical storage systems, and optical switching.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings. It is to be noted, however, that the appended drawings depict preferred embodiments by way of example, not by way of limitations. The drawings illustrate only typical embodiments of this invention and are therefore not to be considered limiting of its scope, for the invention may admit to other equally effective embodiments. In the drawings, like reference numerals refer to the same or similar elements.

FIG. 6 provides a table of the thicknesses and residual stresses of the membrane plate and the PZT thin film that are components of a varifocal optical system in accordance with the present invention.

FIG. 9A illustrates a single-sided refractive lens, and FIG. 9B illustrates a double-sided refractive lens.

DETAILED DESCRIPTION OF THE PREFERRED EMBODIMENT

The present invention uses thin film piezoelectric technology to deform relatively stiff plates so as to achieve high-frequency deformable optical components. In particular, the present invention features high speed micro-optical components whose focal length is controlled by piezoelectric actuation of thin-film PZT. Tuning ranges of several hundred microns have been achieved. High speed micro-optical components in accordance with the present invention are useful for a variety of applications in which high-speed focal-length variability is required, including but not limited to optical switching applications, and high-speed confocal microscopy.

Figure 1:
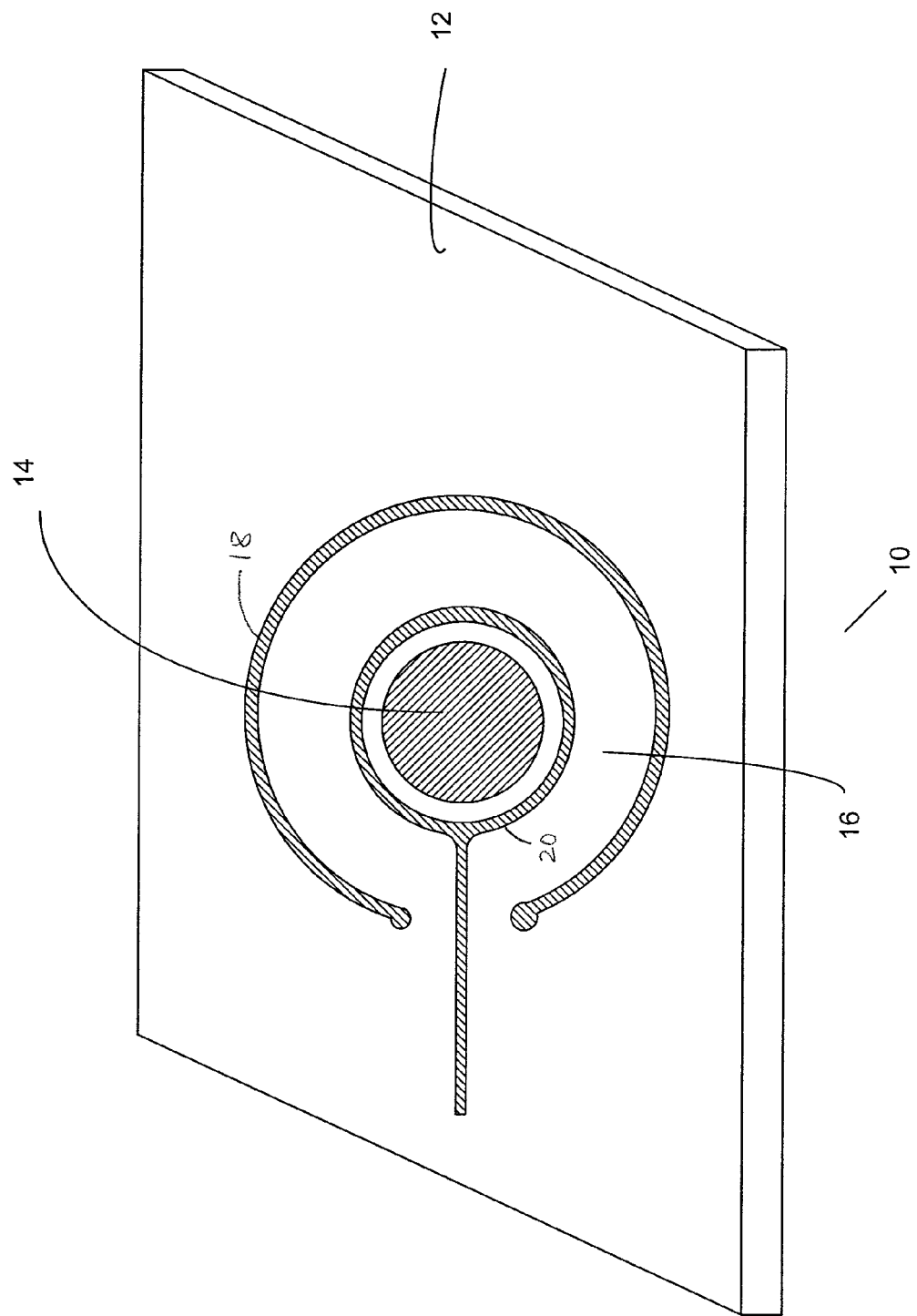
FIG. 1 illustrates a schematic overview of a varifocal optical system, constructed in accordance with one embodiment of the present invention.

FIG. 1 illustrates a schematic overview of a varifocal optical system 10, constructed in accordance with one embodiment of the present invention. In overview, the varifocal optical system 10 includes a substrate 12, a membrane 14, and a piezoelectric thin film 16 deposited on at least a portion of the surface of the membrane 14. The membrane 14 is an optical element, for example a mirror or a lens. Preferably, the membrane 14 is a substantially circular membrane plate, and is MEMS-machined. The piezoelectric thin film 16 has a substantially ring-shaped configuration, and is deposited on the outer portion of the circular membrane plate 14. A first electrode 18 is disposed at an outer edge of the thin film 16, and a second electrode 20 is disposed at an inner edge of the film 16. The membrane 14 is initially in a buckled state. In other words, the membrane 14 is characterized by an initial, nominal curvature. Henceforth in this application "nominal curvature" means the curvature of the membrane 14 in its unactuated state, i.e. with no voltage applied between the electrodes on the piezoelectric thin film.

Figure 2:
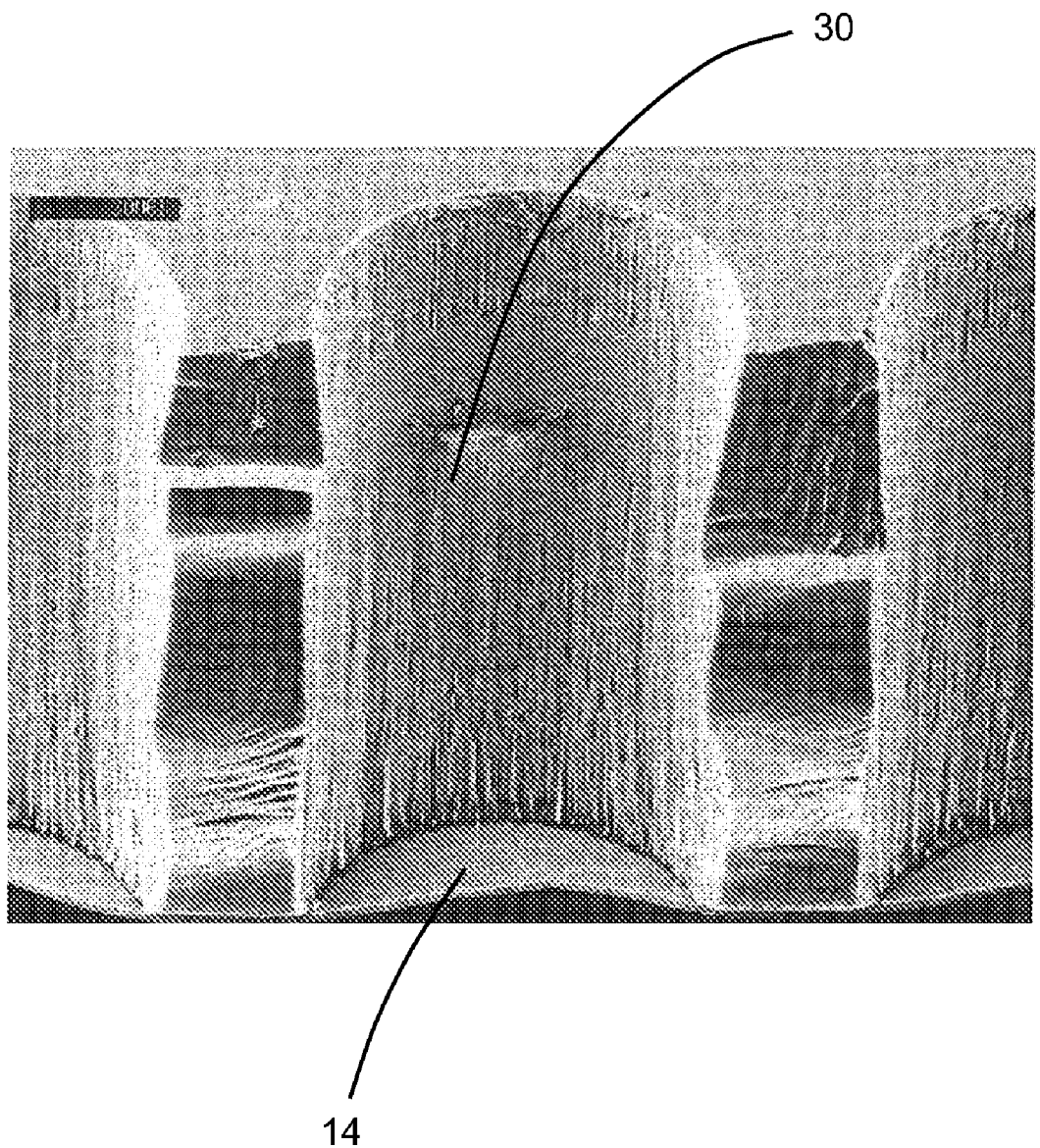
FIG. 2 illustrates a cross-sectional SEM (scanning electron microscope) view of a varifocal optical system constructed in accordance with one embodiment of the present invention.

FIG. 2 illustrates a cross-sectional SEM (scanning electron microscope) view of the varifocal optical system 10 constructed in accordance with the present invention. In particular, the SEM micrograph illustrates the substantially circular mirror membrane 14, which in the illustrated embodiment is released by a backside deep RIE (reactive ion etching) through-wafer etch. As known in the art, reactive ion etching involves the bombardment of energetic ions to knock off portions of the wafer material by transfer of physical momentum. As shown in FIG. 2, the etching provides a cylindrical void region 30 underneath the substantially circular membrane 14. The membrane 14 may be a composite layer, and may include, by way of example, insulating layers of $Z_rO_2$ and $S_iO_2$ on a polysilicon structural layer. The membrane 14 may also include thermal oxide, and LTO (low temperature oxide).

Figure 3:
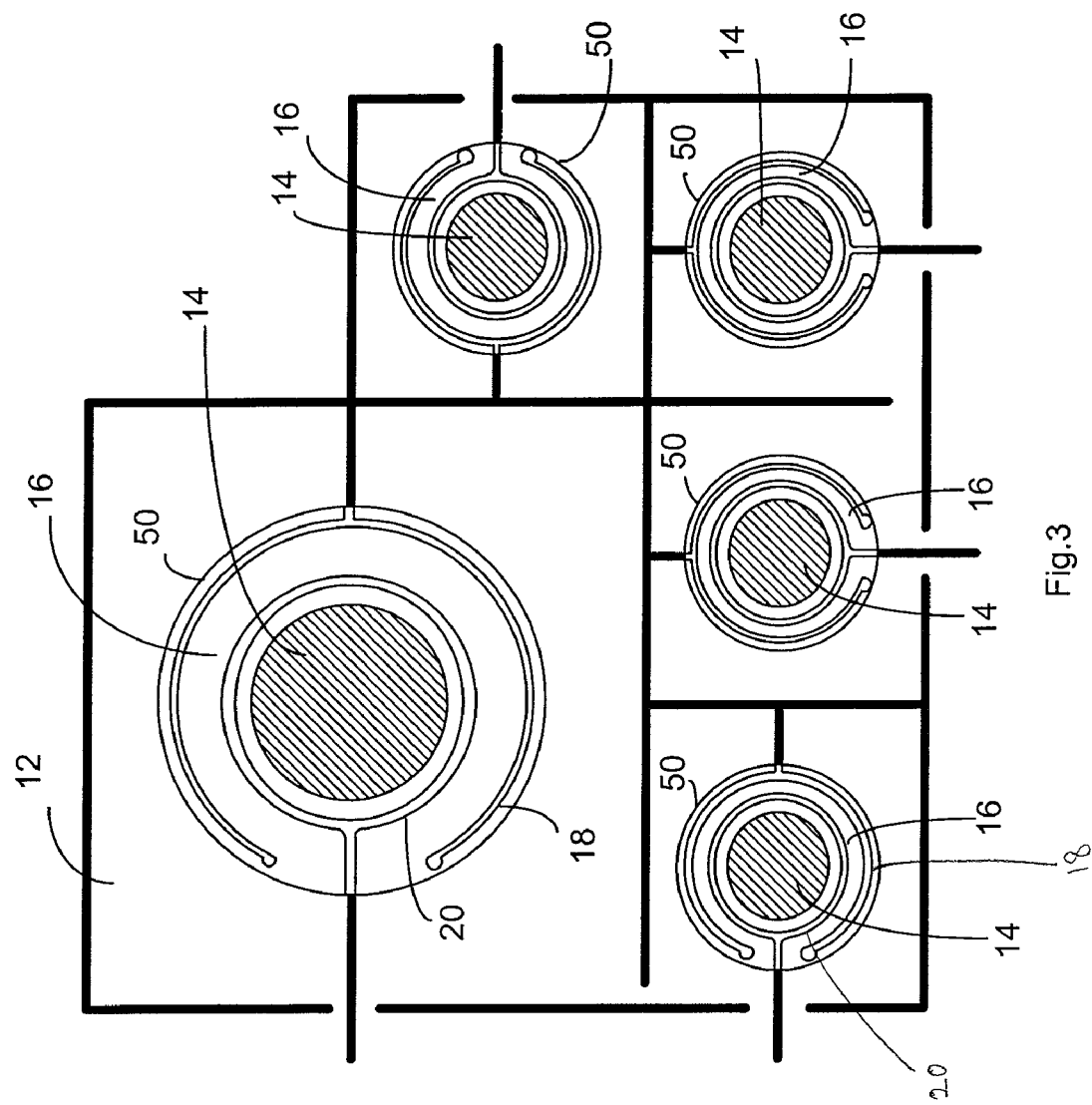
FIG. 3 illustrates a top view micrograph of two different sizes of varifocal optical systems, constructed in accordance with one embodiment of the present invention.

FIG. 3 illustrates a top view micrograph of two different sizes of varifocal optical systems, constructed in accordance with one embodiment of the present invention. As shown in FIG. 3, the top surface of each membrane 14 has a ring-shaped piezoelectric actuation layer 16. FIG. 3 shows a membrane plate 14 of 300 microns radius etched on the same substrate 12 as four other membrane plates 14, each having 150 micron radii. The circular boundaries 50 of each microoptical component are shown in FIG. 3 as demarcating the backside-released membrane plates. Each varifocal system also has ring shaped inner and outer electrodes 20 and 18.

Figure 4:
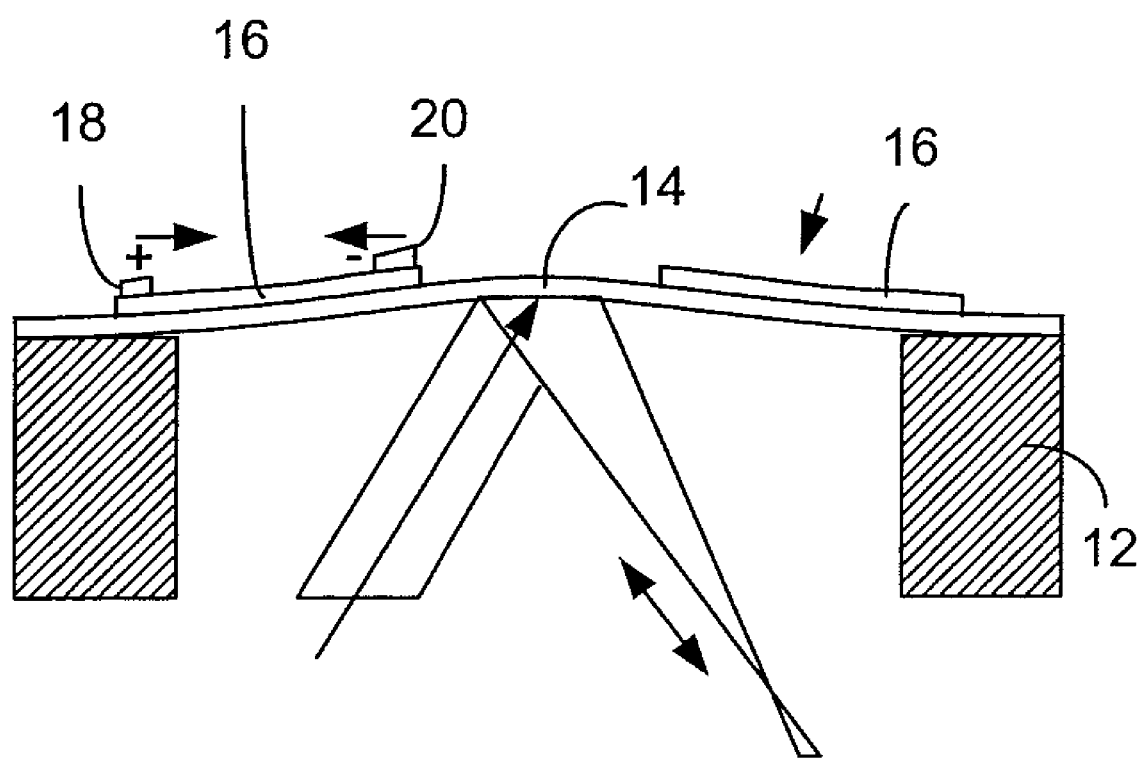
FIG. 4 illustrates a cross-sectional view of a varifocal optical system, constructed in accordance with one embodiment of the present invention.

FIG. 4 illustrates a cross-sectional view of one of the varifocal optical systems illustrated in FIG. 3. In the present invention, thin film piezoelectric technology is used to alter the buckled state of the membrane 14. Thin film piezoelectric technology provides both the decrease in mass and the necessary forces required to deform relatively stiff plates required to achieve high-frequency deformable optical components. An electric voltage is applied to the piezoelectric thin film layer 16, between the first electrode 18 and the second electrode 20. Upon application of the voltage, a lateral strain is generated in the thin film 16, which changes the membrane buckling. In this way, the nominal curvature of the membrane 14, and thus its focal length, is altered.

The piezoelectric thin film 16 is preferably made of PZT material, although other types of piezoelectric materials are also within the scope of the present invention. Because of its high dielectric and piezoelectric constant, PZT materials yield a larger stored energy density and strain, offering the possibility of significantly larger bending moments at lower excitation voltages. In the embodiment illustrated in FIGS. 3 and 4, the varifocal optical system is an iris-shaped structure, composed of a sol-gel monomorph PZT layer, which is the piezoelectric layer 16 that is deposited on the membrane 14. The membrane 14 consists of insulating layers of $Z_rO_2$ and $S_iO_2$, on a polysilicon structural layer. By way of example, a sol-gel spin-on technique, known in the art, may be used to fabricate the PZT thin film 16.

In an exemplary embodiment in which a sol-gel process is used to fabricate the PZT thin film, lead acetate trihydrate is dissolved in 2-methoxyethanol at 70 degrees Celsius and refluxed. The water of hydration from this Pb precursor is distilled through a reflux condenser to facilitate the addition of moisture sensitive alkoxides of $T_i$ and $Z_r$. The byproducts of the reaction are expelled, following prolonged refluxing, at 80 degrees Celsius. The solution is then partially hydrolysed, and a controlled amount of acid or base is added as catalyst. A multi-step spin-on process can be used, with pyrolysis at 400 degrees Celsius after each step to remove the organics. After the films are built up to the desired thickness, the films are crystallized by annealing at temperatures above 500 degrees Celsius.

Figure 5:
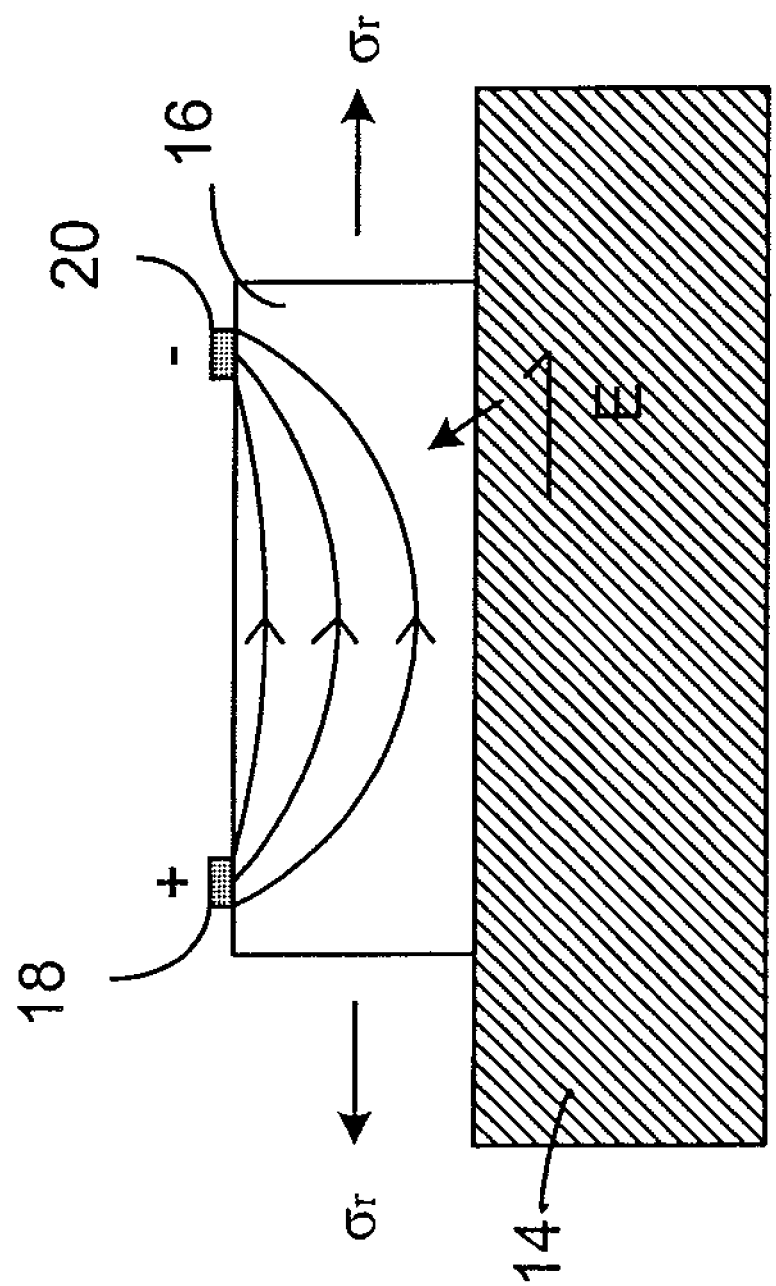
FIG. 5 illustrates a cross-sectional schematic of an in-plane excitation of a PZT thin film actuator, and the induced bending moment.

In a preferred embodiment of the invention, an in-plane polarization scheme is used, in order to maximize tunability. FIG. 5 illustrates a cross section schematic of an in-plane excitation of a PZT thin film actuator 16, and the induced bending moment. The in-plane polarization scheme illustrated in FIG. 5 makes use of the $d_{33}$ rather than $d_{31}$ piezoelectric coefficient of the PZT. The $d_{33}$ coefficient, at approximately 200 pm/V, is typically at least twice as large as $d_{31}$ for PZT. The illustrated in-plane scheme results in an important design tradeoff: because the capacitor formed by this configuration has a small cross-sectional area (film thickness times electrode length) and a large dielectric gap (electrode spacing), the capacitance can be made very small, at the expense of requiring a large voltage to induce a sufficiently large electric field. In the illustrated embodiment, the measured capacitances (for both diameters of the circular membrane) are approximately 0.7 pF. The piezoelectrically actuated stress may be accounted for by adding a residual plane stress to the PZT region between the electrodes 18 and 20, the residual plane stress having a value $$\sigma_{PZT} = \frac{Y}{1-v^2} d_{33} E_r,$$

where Y is Young's modulus, v the Poisson ratio, and $E_r$ the radial applied field.

A key requirement for fabricating controlled-buckle membranes is the control of the residual stresses in the thin layers making up the membrane. These stresses determine the initial curvature of the membrane mirror structure, and are thus important in determining the tuning range in which a particular mirror can operate. Further, the thickness and lateral dimensions of the membrane control the degree of buckling for given residual stresses and applied excitation voltage.

The performance characteristics of the varifocal optical system 10 are therefore strongly dependent upon various design parameters, including total and relative film thickness, and the radii of the mirror membrane and piezoelectric ring actuator. Table 1 in FIG. 6 provides the film thickness and residual stress of the membrane plate 14, and the piezoelectric layer 16, for the preferred embodiment shown in FIG. 4. In this embodiment, the membrane plate 14 is a composite layer formed of thermal oxide, polysilicon, LTO (low temperature oxide), and insulating $Z_rO_2$. The average residual stress values for the composite layers listed in Table 1 were obtained by measuring cantilever deflections of the materials forming the membrane plate 39.

Figure 7:
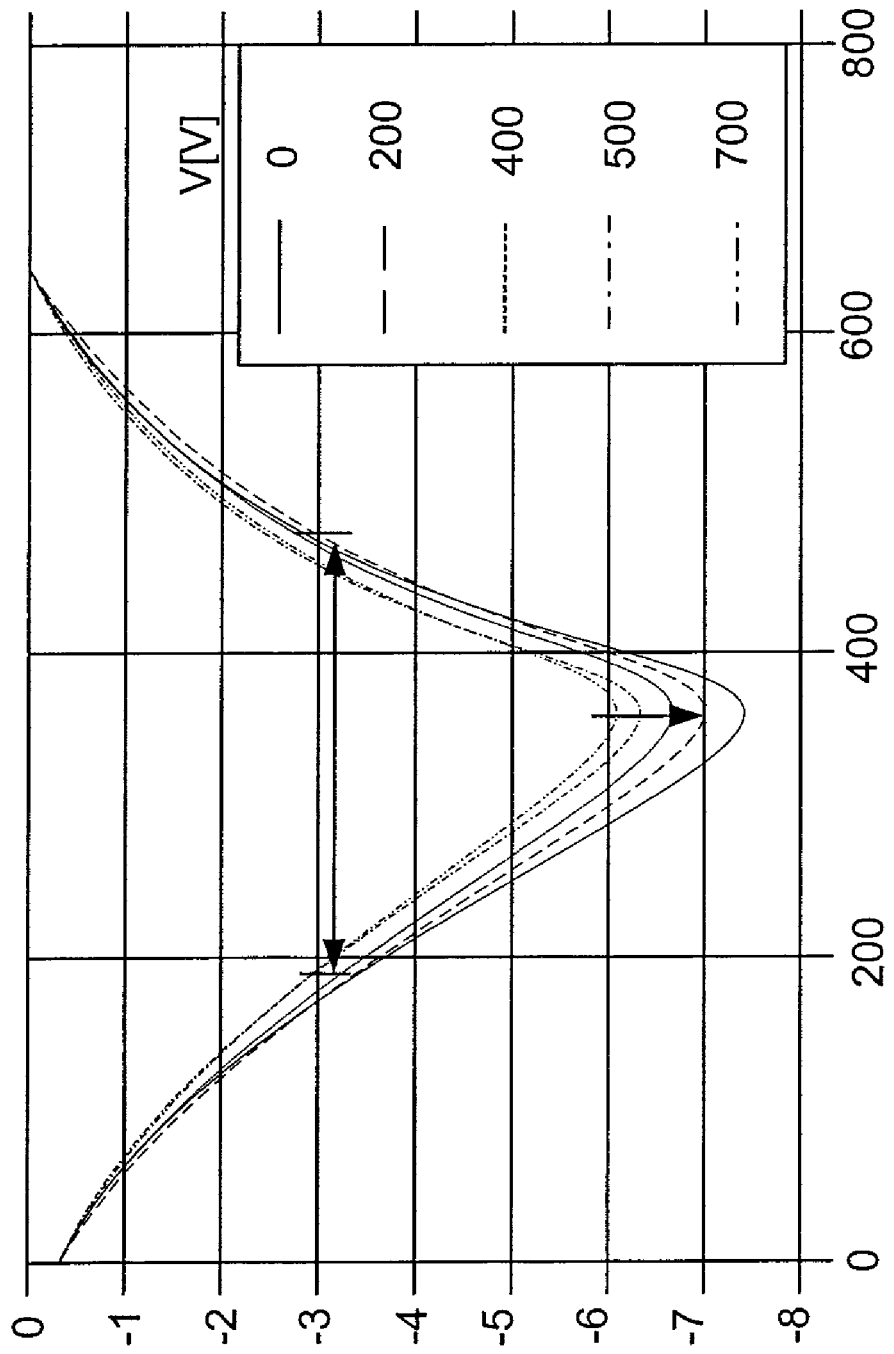
FIG. 7 illustrates a series of deflection profiles for a substantially circular membrane that is a component of a varifocal optical system in accordance with the present invention.

One advantage of the varifocal optical system of the present invention lies in its geometrical design, which intrinsically provides a parabolic curvature, because a parabolic curvature is ideal for imaging, and for coherent data transmission. FIG. 7 illustrates a series of deflection profiles for the circular membrane 14. These profiles have been obtained by extracting a portion of the data for 3-D (three-dimensional) image renderings of measured 2-D (two-dimensional) surface profiles of the circular membrane 14. More specifically, a portion of the data corresponding to a single cross section that runs through the center of the membrane 14 was used. Each trace is taken at a different actuator excitation voltage, ranging from 0 to 700 volts. As indicated in the figure, solid, dashed, dotted, and dash-dotted curves are used to differentiate the curves corresponding to the different voltages. As seen in FIG. 7, the nominal (unactuated) deflection of the deformable mirror membrane 14, having a radius of 300 microns and a total membrane thickness of about 6.3 microns, is about 7.2 microns. The membrane 14 is thus in a buckled state. In the present invention, the buckled state of a circular membrane is used to increase the focal length tuning range.

The effective apertures of the varifocal optical system 10, i.e. the sizes of the parabolic regions for the deformable mirror 14 that would serve to focus light with little or no aberration, can be obtained by data analysis of the curves illustrated in FIG. 7. The parabolic regions for both mirror sizes (R=150 microns and 300 microns, respectively) are indicated between arrows in FIG. 7. In the illustrated embodiment, piezoelectric ring geometry is used to concentrate the curvature of the membrane 14 in the optically active region of the system. The criterion used for selecting this effective diameter or aperture size was a correlation corresponding to $R^2 > 0.99$ between a parabolic fit and the measured data over the fitted interval. For both sizes of mirrors tested, this diameter was very close to one half the total diameter of the thin film plate. Thus the effective apertures for the two devices were 150 μm and 300 μm.

Figure 8A:
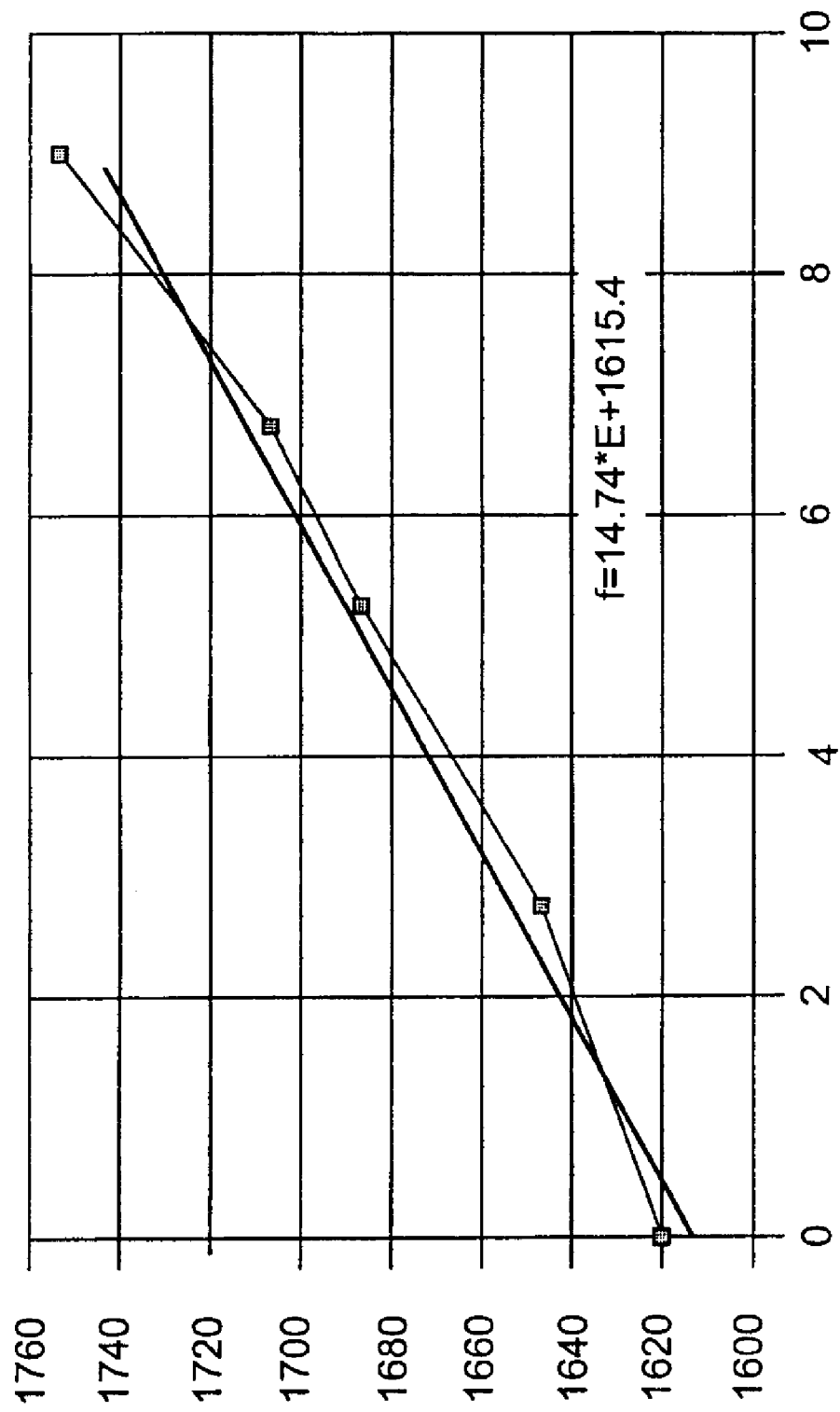
FIGS. 8A and 8B illustrate the tuning sensitivity as a function of applied voltage for deformable mirrors having radii of 300 microns and 150 microns, respectively.
Figure 8B:
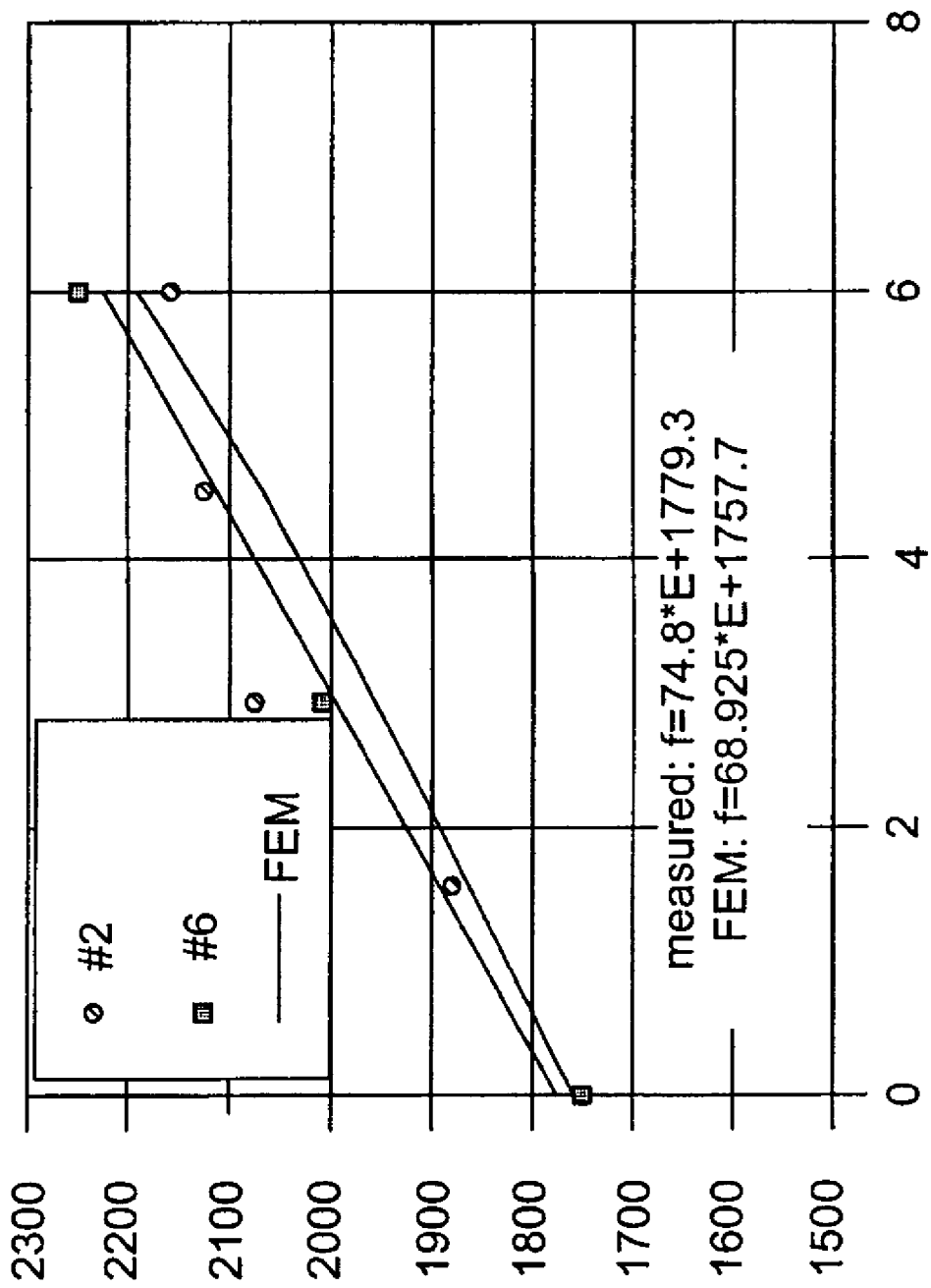

FIGS. 8A and 8B illustrate the tuning sensitivity, i.e. the change in the measured focal lengths as a function of applied voltage, for deformable mirrors having radii of R=300 micrometers and R=150 micrometers, respectively. Each experimental data point represents the average focal length obtained by taking an x- and y-cross section of the 3-D interferometer data used in FIG. 7. As indicated by FIGS. 8A and 8B, the focal lengths of the 300 micron-radius device can be made to vary between about 1600 microns to about 1800 microns, whereas the focal lengths of the 150 micron-radius device can be made to vary between about 1700 to about 2300 microns. A focal length tuning range of several hundred microns has thus been demonstrated. The use in the present invention of the buckled state of a circular membrane maximizes focal length tuning range.

FIGS. 8A and 8B also illustrate the comparison of the experimental data points with a finite element method simulation. As seen from FIGS. 8A and 8B, both the 300 micron and the 150 micron radius devices demonstrate very good linearity. The agreement between the measured and predicted tuning sensitivity is also very good.

Figure 9A:
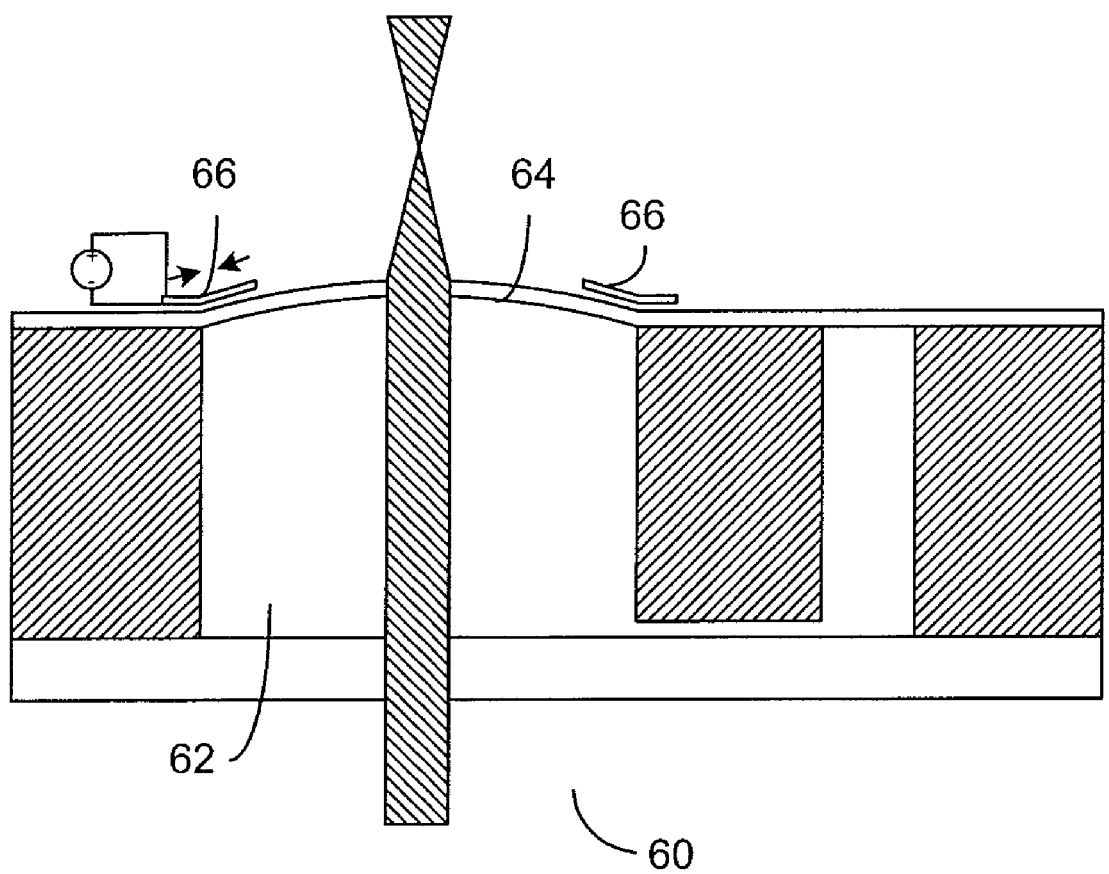
FIGS. 9A and 9B illustrate embodiments of the present invention in which the piezoelectric deflection of circular membranes is used to change the shape of a volume of refractive liquid.
Figure 9B:
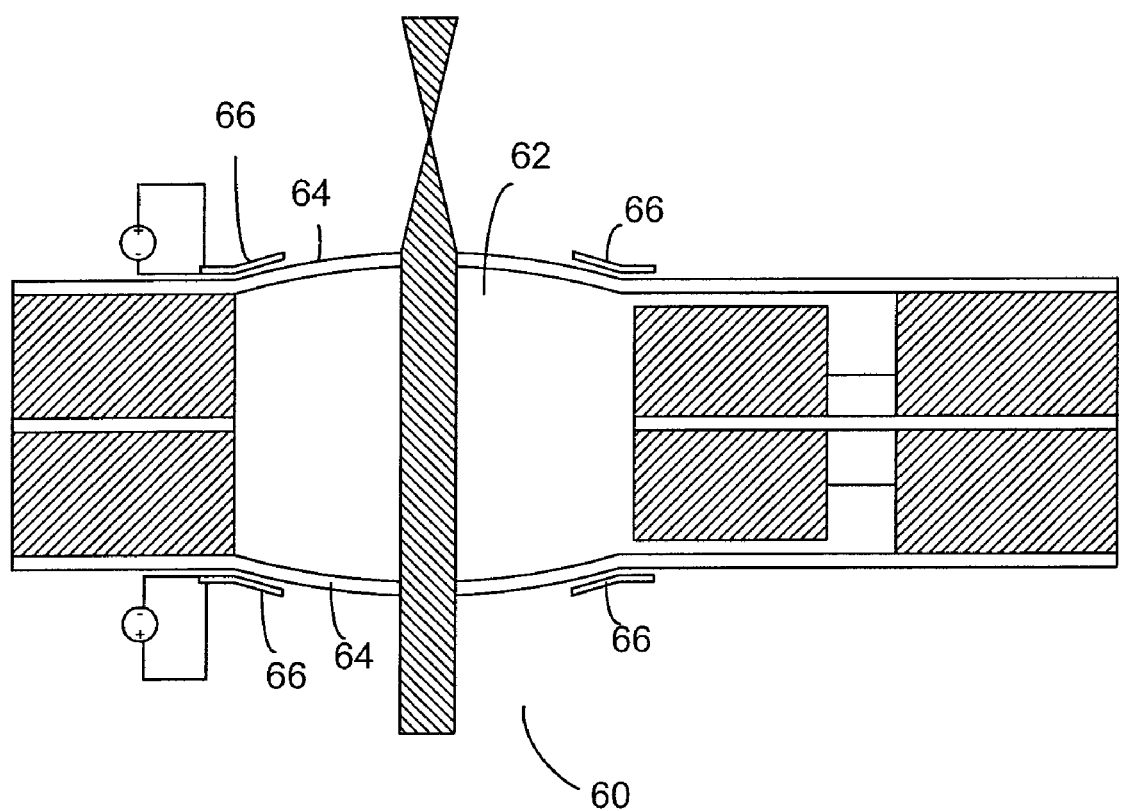

FIGS. 9A and 9B illustrate an alternative embodiment of the present invention, that includes a varifocal lens 60 rather than a varifocal mirror. In this embodiment, the piezoelectric deflection of circular membranes is used to change the shape of a volume of refractive liquid. In this embodiment, the deformable optical element is a lens, rather than a mirror. In particular, a PZT thin film is used to generate a controlled curvature in a transparent varifocal membrane that shapes a refractive liquid medium 62 that functions as an optical lens. In the varifocal lens 60, one or more membranes 64, characterized by a built-in curvature, form one or more boundaries of the volume of refractive liquid 62. A thin film PZT actuation layer 66 is disposed on the outer portion of the curved membrane. Application of a voltage induces piezoelectric stress on the thin film, thereby changing the curvature of the membrane 64. The deflection of the membrane 64 is used to change the shape of the volume of refractive fluid, and thus to alter the focal length of the varifocal lens 60. FIG. 9A illustrates a single-sided lens 60 including a single membrane layer and a single tuning range. FIG. 9B illustrates a double-sided lens 60 having a first and second membrane layer that forms the upper and lower boundary of the volume of refractive liquid, and thus a double tuning range.

The varifocal optical system of the present invention, can provide new capabilities in numerous applications, including but not limited to sample height variation compensation in scanning confocal microscopy, vibration compensation, and collimation correction of poorly collimated beams in optical switching applications where path lengths change.

Figure 10:
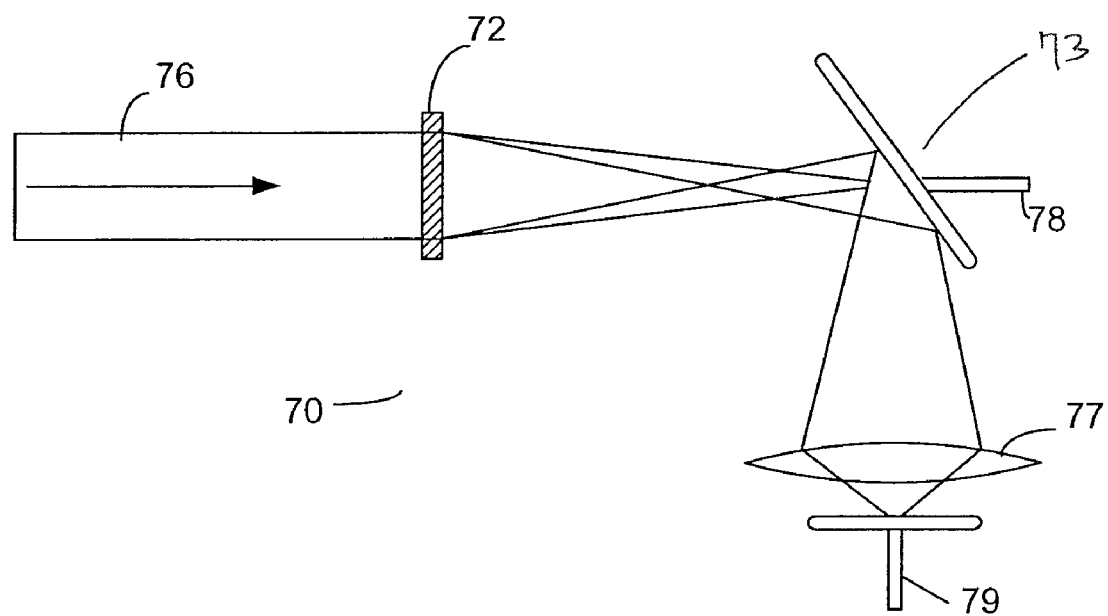
FIG. 10 illustrates an optical switch having a varifocal lens constructed in accordance with the present invention.

FIG. 10 schematically illustrates an optical switch 70 including a varifocal lens 72 constructed in accordance with the present invention. The optical switch 70 is a 1×2 optical switch, and includes an input fiber 76, a varifocal lens 72, a first output fiber 78, and a second output fiber 79. The input fiber 76 is adapted to transmit therethrough incoming optical radiation, generated for example by a laser (not shown). The varifocal lens 72 is a microlens that includes a PZT film deposited on a membrane plate, as described in conjunction with FIGS. 2-4 above. The tuning range of the varifocal lens 72 includes at least a first focal length f1 and a second focal length f2. When the focal length of the varifocal lens 72 is tuned to the first focal length f1, the optical switch 70 directs the incoming optical radiation onto the first output fiber 78 through a pinhole aperture 73. When the focal length of the varifocal lens 72 is tuned to the second focal length f2, the optical switch 70 directs the incoming optical radiation onto the second output fiber 79, using a focusing lens 77. The rapid tuning frequency of the varifocal lens 72 allows for switching speeds of about 1 MHz.

Figure 11:
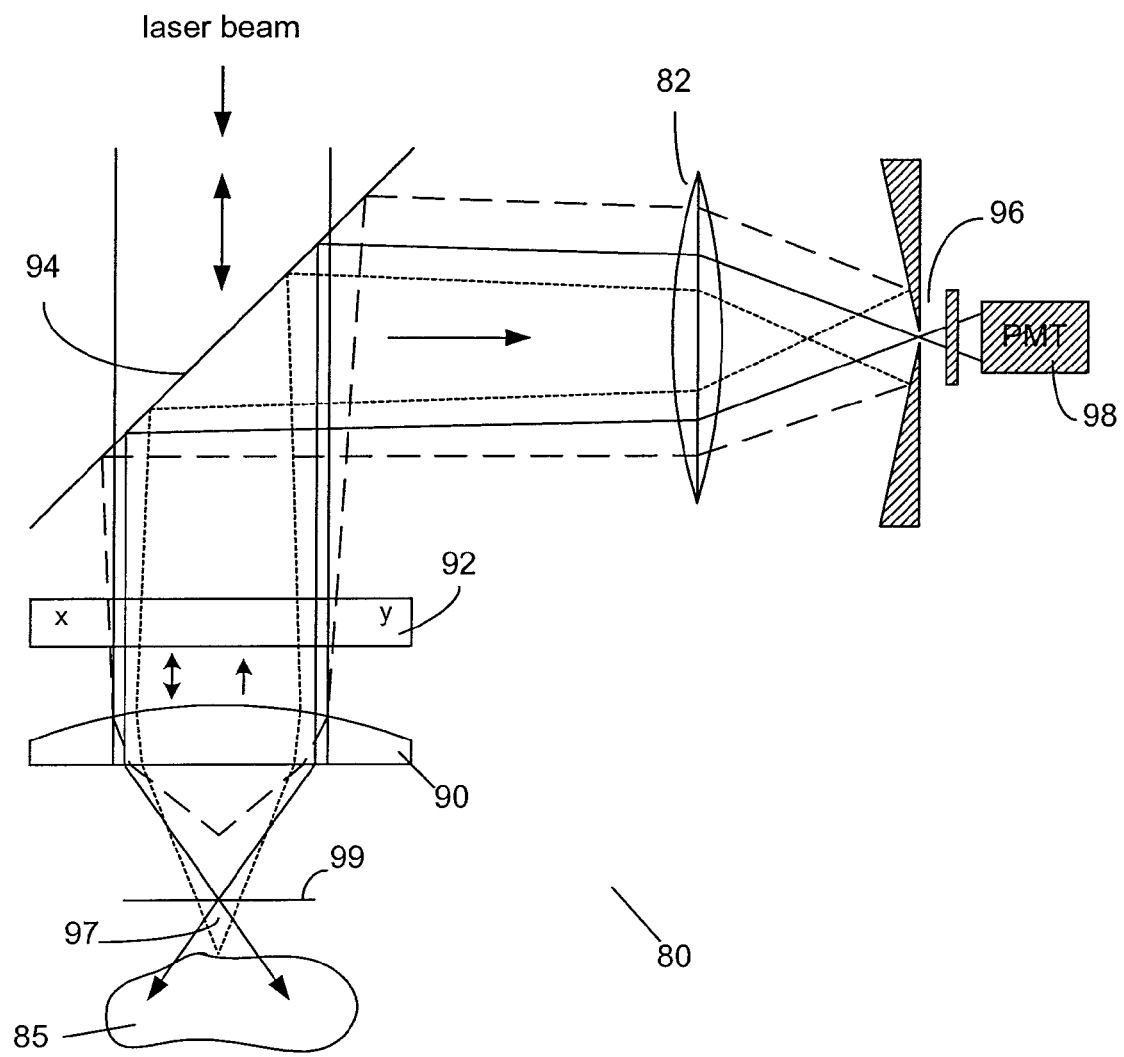
FIG. 11 illustrates a confocal microscope including a varifocal lens constructed in accordance with the present invention.

FIG. 11 illustrates a confocal scanning laser microscope 80 (CSLM) including a varifocal lens 82 constructed in accordance with the present invention. As known in the art, CSLM allows all structures that are out-of-focus to be suppressed during the formation of an image of a fluorescent specimen, by placing a confocal pinhole in front of the image plane. Light from above and below the plane of focus of the object is eliminated from the final image. In FIG. 11, the CSLM that examines a fluorescent specimen 85 includes a microscope objective lens 90, x-y scanning mirrors 92, a dichroic mirror beamsplitter 94, a confocal pinhole aperture 96, and a photodetector 98. A laser beam from a laser source (not shown) is reflected by the dichroic beamsplitter 94, which reflects light of short wavelengths and transmitting light of longer wavelengths. The transmitted light is focused to a spot by the microscope objective lens 90. An illuminating spot 97 is formed in the focal plane 99 of the microscope objective lens 90. Fluorescent light from the specimen 85 travels back through the objective, most fluorescent light passing through the dichroic beamsplitter 94. A varifocal lens 82, constructed in accordance with the description provided above in conjunction with FIGS. 2-4, focuses this light onto the pinhole aperture 96. The movable scanning mirrors 92 are used to illuminate the entire image field, and to collect fluorescent light from it. As seen from the dotted lines in FIG. 11, light from out-of-focus objects are not focused onto the pinhole 96, so that light from out-of-focus parts of the specimen 85 give rise to little or no signal from the detector. Using a high speed varifocal microlens in accordance with the present invention, provides rapid sample height variation compensation for scanning confocal microscopy, or alternatively, the ability to scan samples rapidly in the z-direction (perpendicular to the x-y direction).

Other applications of the present invention may include an embodiment (not shown) in which a varifocal lens constructed in accordance with the present invention provides vibration compensation for disk-based optical storage readout.

In sum, the present invention discloses a deformable microoptical system having a focal length that is controlled by piezoelectric actuation of thin film PZT. Measurements of the nominal focal length and tuning sensitivity of two sizes of micromachined deformable mirrors show reasonable correlation with plate bending solutions generated from finite element models. Tuning ranges of several hundred microns, and a tuning frequency in the low MHz range, have been achieved. The substantial tuning speed and tuning range suggests that the deformable optical system of the present invention can be useful in applications where rapid focal length tuning is a requirement, such as optical switching, and scanning confocal microscopy.

While the invention has been particularly shown and described with reference to specific preferred embodiments, it should be understood by those skilled in the art that various changes in form and detail may be made therein without departing from the spirit and scope of the invention. It is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A varifocal lens, comprising:
   A. a volume of refractive liquid, said liquid being characterized by a focal length;
   B. at least one membrane forming a boundary of said volume of refractive liquid, said membrane being characterized by a curvature;
   C. a PZT thin film deposited directly on said membrane with substantially no intervening structure, said PZT film including a first and second electrode;
   wherein application of an electric voltage between said first electrode and said second electrode alters the dimensions of said film, thereby modifying the curvature of said membrane so as to modify said focal length of said refractive liquid.

2. A varifocal lens, comprising:
   A. a volume of refractive liquid, said liquid being characterized by a focal length;
   B. a first membrane and a second membrane forming the upper and lower boundaries, respectively, of said volume of refractive liquid, each membrane being characterized by a curvature;
   C. a first and a second PZT thin film deposited directly on a respective one of said first and second membranes with substantially no intervening structure, each PZT film including first and second electrodes;
   wherein application of an electric voltage between said first electrode and said second electrode of each PZT thin film alters the dimensions of each film, thereby deforming each respective membrane so as to alter the curvature of each membrane and modify the focal length of said refractive liquid.

3. A varifocal optical lens for sample height variation compensation in a scanning confocal microscope of the type including a beamsplitter, an objective lens for focusing light transmitted by said beamsplitter onto a spot in its focal plane, and a pinhole aperture disposed adjacent to a detector for preventing light from out-of-focus portions of said sample from reaching said detector, said varifocal optical lens comprising:
   A. a substantially circular membrane deposited on a substrate and having a focal length;
   B. a ring-shaped PZT thin film deposited directly on an outer portion of said membrane with substantially no intervening structure and extending between a first electrode and a second electrode;
   wherein application of an electric voltage between said first electrode and said second electrode alters the dimensions of said thin film so as to deform said membrane, thereby altering the focal length of said optical lens; and
   wherein said varifocal optical lens is disposed between said dichroic beamsplitter and said pinhole aperture so as to focus light originating from said sample and transmitted through said beamsplitter onto said aperture, said varifocal optical lens being operable to tune its focal length in order to compensate for sample height variation.

4. A varifocal optical lens according to claim 3, wherein the focal length tuning frequency of said varifocal lens is from about 100 KHz to about 10 MHz.

5. A varifocal optical lens for sample height variation compensation in a scanning confocal microscope of the type including a beamsplitter, an objective lens for focusing light transmitted by said beamsplitter onto a spot in its focal plane, and a pinhole aperture disposed adjacent to a detector for preventing light from out-of-focus portions of said sample from reaching said detector, said varifocal optical lens comprising:
   A. a substantially circular membrane deposited on a substrate and having a focal length;
   B. a ring-shaped PZT thin film deposited on an outer portion of said membrane with and extending between a first electrode and a second electrode;
   wherein application of an electric voltage between said first electrode and said second electrode alters the dimensions of said thin film so as to deform said membrane, thereby altering the focal length of said optical lens; and
   wherein said varifocal optical lens is disposed between said dichroic beamsplitter and said pinhole aperture so as to focus light originating from said sample and transmitted through said beamsplitter onto said aperture, said varifocal optical lens being operable to tune its focal length in order to compensate for sample height variation,
   wherein the focal length tuning frequency of said varifocal lens is about 1 MHz.

6. A varifocal optical lens according to claim 3, wherein the focal length tuning frequency of said varifocal lens is from about 1 MHz to about 10 MHz.

7. A varifocal optical lens according to claim 1, wherein the focal length tuning frequency of said varifocal lens is from about 100 KHz to about 10 MHz.

8. A varifocal optical lens according to claim 1, wherein the focal length tuning frequency of said varifocal lens is from about 1 MHz to about 10 MHz.

9. A varifocal optical lens according to claim 1, wherein the focal length tuning frequency of said varifocal lens is about 1 MHz.

10. A varifocal optical lens according to claim 2, wherein the focal length tuning frequency of said varifocal lens is from about 100 KHz to about 10 MHz.

11. A varifocal optical lens according to claim 2, wherein the focal length tuning frequency of said varifocal lens is from about 1 MHz to about 10 MHz.

12. A varifocal optical lens according to claim 2, wherein the focal length tuning frequency of said varifocal lens is about 1 MHz.

* * * * *